(12) United States Patent
Tseng

(10) Patent No.: US 8,939,691 B2
(45) Date of Patent: Jan. 27, 2015

(54) FLOATING FASTENER

(71) Applicant: Hanwit Precision Industries Ltd., New Taipei (TW)

(72) Inventor: Ying-Chih Tseng, New Taipei (TW)

(73) Assignee: Hanwit Precision Industries Ltd., New Taipei (TW)

( * ) Notice: Subject to any disclaimer, the term of this patent is extended or adjusted under 35 U.S.C. 154(b) by 204 days.

(21) Appl. No.: 13/757,349

(22) Filed: Feb. 1, 2013

(65) Prior Publication Data

US 2014/0105707 A1   Apr. 17, 2014

(30) Foreign Application Priority Data

Oct. 11, 2012 (TW) .............................. 101219654 U

(51) Int. Cl.
F16B 21/04 (2006.01)

(52) U.S. Cl.
CPC ..................................... F16B 21/04 (2013.01)
USPC .......................................................... 411/347

(58) Field of Classification Search
CPC ....................................................... F16B 21/04
USPC .................................. 411/337, 347, 500, 511
See application file for complete search history.

(56) References Cited

U.S. PATENT DOCUMENTS

| | | | | |
|---|---|---|---|---|
| 3,510,922 A * | 5/1970 | Dzus et al. | ...................... | 411/555 |
| 5,240,361 A * | 8/1993 | Armstrong et al. | ........... | 411/347 |
| 5,382,124 A * | 1/1995 | Frattarola | ...................... | 411/352 |
| 7,905,696 B2 * | 3/2011 | Chiu | .............................. | 411/353 |
| 7,922,432 B2 * | 4/2011 | Chiu | .............................. | 411/107 |
| 7,938,607 B2 * | 5/2011 | Wang | ........................... | 411/107 |
| 8,074,337 B2 * | 12/2011 | Wang | ........................... | 411/171 |
| 8,087,861 B2 * | 1/2012 | Wang | ........................... | 411/353 |
| 8,371,786 B2 * | 2/2013 | Chiu | .............................. | 411/353 |
| 8,388,288 B2 * | 3/2013 | Chiu | .............................. | 411/107 |
| 8,393,840 B2 * | 3/2013 | Chiu | .............................. | 411/353 |
| 8,491,246 B2 * | 7/2013 | Chao et al. | ..................... | 411/347 |
| 8,555,466 B1 * | 10/2013 | Wang | ............................. | 16/422 |
| 8,591,160 B2 * | 11/2013 | Shinozaki | ..................... | 411/347 |
| 8,690,506 B2 * | 4/2014 | Wang | ........................... | 411/347 |
| 8,708,595 B2 * | 4/2014 | Tseng | .......................... | 403/349 |
| 8,827,614 B2 * | 9/2014 | Tseng | .......................... | 411/107 |
| 2007/0172336 A1 * | 7/2007 | Hsu | ............................... | 411/508 |
| 2010/0132178 A1 * | 6/2010 | Chiu | ........................... | 29/281.5 |
| 2010/0137116 A1 * | 6/2010 | Chiu | ............................. | 483/17 |
| 2010/0232908 A1 * | 9/2010 | Chiu | ............................. | 411/554 |
| 2010/0290860 A1 * | 11/2010 | Wang | ........................... | 411/105 |
| 2010/0290861 A1 * | 11/2010 | Wang | ........................... | 411/107 |
| 2010/0290864 A1 * | 11/2010 | Wang | ........................... | 411/383 |
| 2011/0045915 A1 * | 2/2011 | Wang | ............................. | 470/10 |
| 2011/0067219 A1 * | 3/2011 | Wang | ............................. | 29/428 |
| 2011/0070046 A1 * | 3/2011 | Wang | ............................ | 411/120 |
| 2011/0070049 A1 * | 3/2011 | Wang | ........................ | 411/372.6 |

(Continued)

*Primary Examiner* — Gay Ann Spahn
(74) *Attorney, Agent, or Firm* — Muncy, Geissler, Olds & Lowe, P.C.

(57) ABSTRACT

A floating fastener includes a mounting base member affixed to a first panel member, a rotary fastening member supported on an elastic member in the mounting base member for locking a second panel member to the first panel member through a rotary motion, and a cap member affixed to the head of the rotary fastening member and axially slidably coupled to the mounting base member and rotatable to shift inside longitudinal ribs relative to vertical guide grooves at a locating flange around the periphery of the mounting base member and to move the rotary fastening member between a locking position and an unlocking position.

8 Claims, 11 Drawing Sheets

(56) References Cited

U.S. PATENT DOCUMENTS

| | | | |
|---|---|---|---|
| 2011/0081218 A1* | 4/2011 | Wang | 411/120 |
| 2011/0121054 A1* | 5/2011 | Chiu | 228/44.3 |
| 2011/0123291 A1* | 5/2011 | Chiu | 411/342 |
| 2011/0135421 A1* | 6/2011 | Chiu | 411/167 |
| 2011/0302759 A1* | 12/2011 | Chiu | 29/428 |
| 2011/0308065 A1* | 12/2011 | Wang | 29/527.2 |
| 2012/0040035 A1* | 2/2012 | Chiu | 425/110 |
| 2012/0057947 A1* | 3/2012 | Chiu | 411/105 |
| 2012/0170993 A1* | 7/2012 | Chiu | 411/350 |
| 2012/0189400 A1* | 7/2012 | Chiu | 411/82 |
| 2012/0195711 A1* | 8/2012 | Chiu | 411/103 |
| 2012/0224935 A1* | 9/2012 | Chiu | 411/352 |
| 2012/0237315 A1* | 9/2012 | Chiu | 411/171 |
| 2012/0237316 A1* | 9/2012 | Chiu | 411/353 |
| 2012/0251265 A1* | 10/2012 | Chiu | 411/349 |
| 2012/0301244 A1* | 11/2012 | Chiu | 411/166 |
| 2013/0170895 A1* | 7/2013 | Tseng | 403/270 |
| 2013/0269152 A1* | 10/2013 | Wang | 16/422 |
| 2013/0294863 A1* | 11/2013 | Tseng | 411/175 |
| 2014/0064837 A1* | 3/2014 | Tseng | 403/327 |
| 2014/0064876 A1* | 3/2014 | Tseng | 411/147 |
| 2014/0068921 A1* | 3/2014 | Tseng | 411/132 |

\* cited by examiner

FLOATING FASTENER

This application claims the priority benefit of Taiwan patent application number 101219654, filed on Oct. 11, 2012.

BACKGROUND OF THE INVENTION

1. Field of the Invention

The present invention relates to fastener means for detachably securing two panel members together and more particularly, to a floating fastener, which comprises a mounting base member affixed to a first panel member, a rotary fastening member supported on an elastic member in the mounting base member for locking a second panel member to the first panel member through a rotary motion, and a cap member affixed to the head of the rotary fastening member and axially slidably coupled to the mounting base member and rotatable to shift inside longitudinal ribs thereof relative to vertical guide grooves at a locating flange around the periphery of the mounting base member and to move the rotary fastening member between a locking position and an unlocking position.

2. Description of the Related Art

When joining panel members, fastening devices respectively formed of a lock screw, a rotary knob and a washer may be used. During application, the lock screw, rotary knob and washer of each fastening device are assembled and then mounted at a first panel member. When fastening the first panel member to a second panel member, rotate the rotary knob of each fastening device to drive the respective lock screw into a respective mounting screw hole at the second panel member, and then use a hand tool to fasten tight the lock screw. These fastening devices are widely used in server racks for telecommunication, industrial computers, machine tools, and other situations where multiple panel members are to be fastened in a stack.

Further, FIG. 11 illustrates a floating fastener D for use to lock panel members together. As illustrated, this design of floating fastener D comprises a socket member C, which comprises a bottom mounting flange C2 extended from the bottom side thereof and affixed to a first panel member E and a top stop flange C1 around the periphery of the top side thereof, a lock screw A1 inserted through the socket member C and fastenable to a second panel member E1 that is attached to the bottom side of the first panel member E, a spring member B mounted in the socket member C around the lock screw A1 and stopped between an inside part of the socket member C and the flat bottom wall of the head A11 of the lock screw A1, and a cap member A affixed to the head A11 of the lock screw A1 with an inside bottom flange A2 thereof axially slidably coupled to the periphery of the socket member C and stoppable at the bottom side of the top stop flange C1 of the socket member C.

When using the aforesaid floating fastener D in a server rack for telecommunication, industrial computer or machine tool to lock panel members, the application of the floating fastener D may be restricted due to space limitation. Further, it needs a proper hand tool to fasten the lock screw A1 of the floating fastener D to a panel member E1. If a proper hand tool is not available, the mounting or dismounting work will be interrupted, resulting in increased cost of work. An improvement in this regard is required.

SUMMARY OF THE INVENTION

The present invention has been accomplished under the circumstances in view. It is therefore the main object of the present invention to provide a floating fastener for locking two panel members together, which has the advantages of ease of use, high installation reliability and high positioning accuracy.

To achieve this and other objects of the present invention, a floating fastener comprises a mounting base member affixed to a first panel member, a rotary fastening member including a head suspending outside the mounting base member and a shank extended from the head and inserted through the mounting base member and terminating in a locking tip for locking a second panel member to the first panel member through a rotary motion, a compression spring mounted around the shank of the rotary fastening member and stopped between the head of the rotary fastening member and an inside part of the mounting base member, and a cap member affixed to the head of the rotary fastening member and axially slidably coupled to the mounting base member and rotatable to move the rotary fastening member between a locking position and an unlocking position. The mounting base member comprises a locating flange extending around the periphery thereof, and a plurality of vertical sliding grooves located in the locating flange and equiangularly spaced from one another. The cap member comprises a plurality of longitudinal ribs equiangularly spaced around the inside wall thereof and respectively slidably coupled to the vertical sliding grooves. When rotating the cap member to move the rotary fastening member between the locking position and the unlocking position, the longitudinal ribs are shifted relative to the vertical sliding grooves.

Further, the cap member comprises an inside bottom stop flange curved from the bottom edge thereof and slidably coupled to the periphery of the mounting base member and stoppable at the bottom side of the locating flange of the mounting base member, and a raised portion protruded from the inside wall thereof above the inside bottom stop flange. When lowering the cap member to force the locking tip of the rotary fastening member through an elongated locking hole of the second panel member during a locking operation, the raised portion will be moved over the locating flange of the mounting base member, and the user's hand can sense the elevational change of the cap member relative to the mounting base member where the locking tip of the rotary fastening member has reached the elevation below the bottom edge of the elongated locking hole of the second panel member, and thus the user can rotate the cap member and the rotary fastening member to lock the second panel member to the first panel member.

Further, when rotating the cap member in the reversed direction through a 90° angle to shift the longitudinal ribs from one respective vertical sliding groove of the mounting base member to another respective vertical sliding groove, the rotary fastening member will be pushed upwardly in direction away from the second panel member by the elastic potential energy of the elastic member to the extent where the raised portion of the cap member is stopped at the bottom edge of the locating flange of the mounting base member. At this time, impart an upward pulling force to the cap member to move the raised portion of the cap member over the locating flange of the mounting base member, and thus, the rotary fastening member is disengaged from the second panel member, allowing removal of the first panel member from the second panel member.

DETAILED DESCRIPTION OF THE PREFERRED EMBODIMENT

Figure 1:
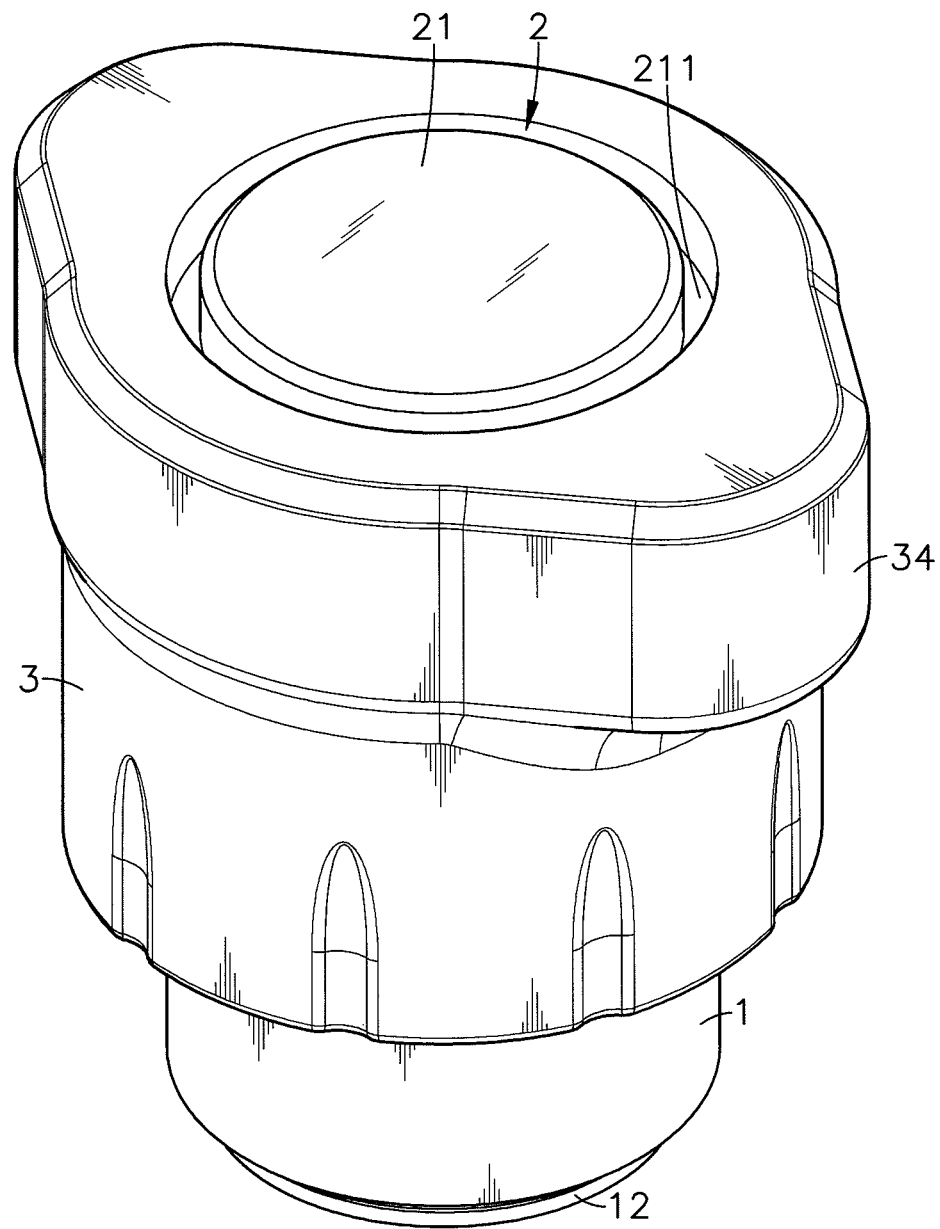
FIG. 1 is an oblique top elevational view of a floating fastener in accordance with the present invention.
Figure 2:
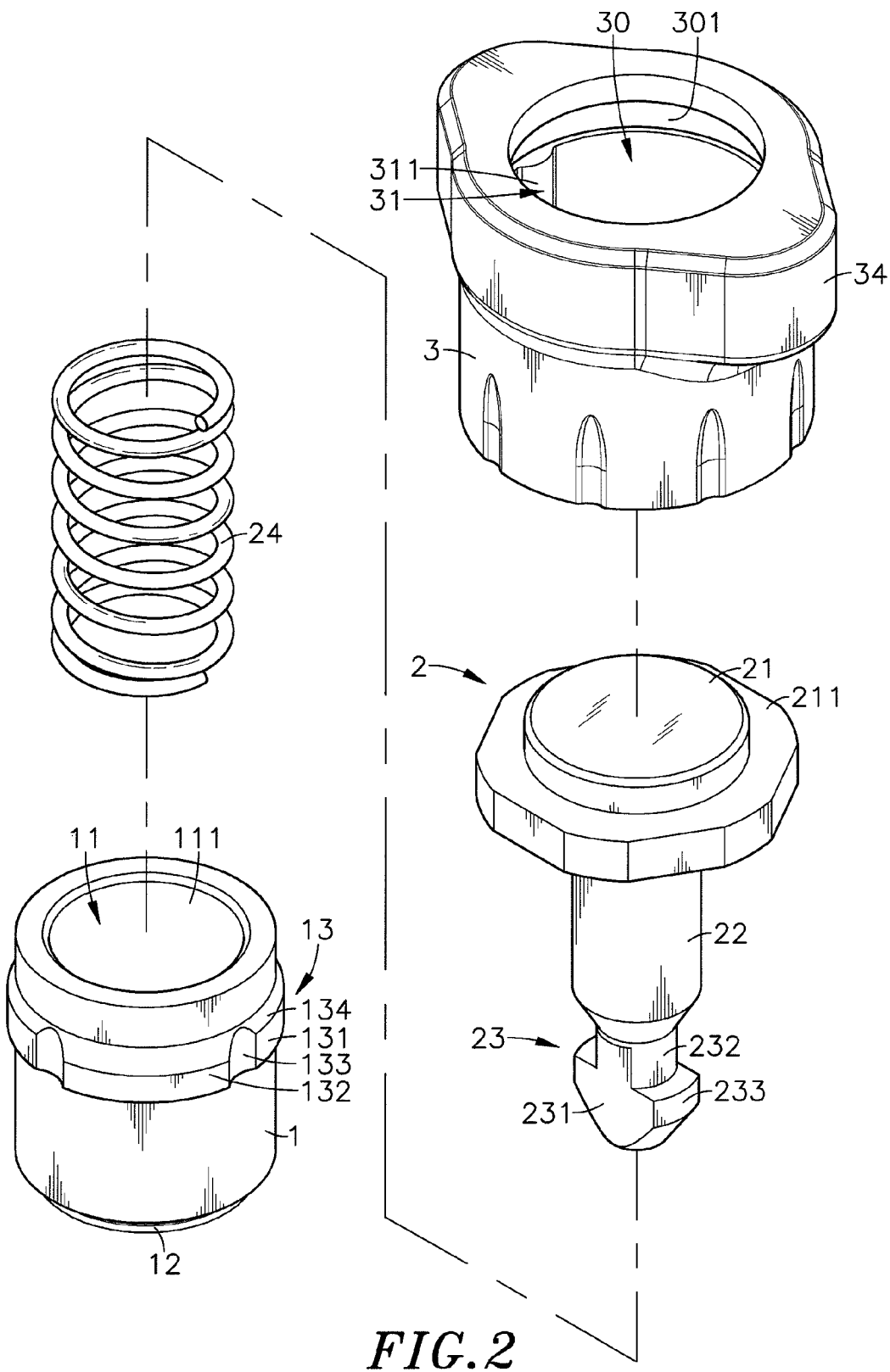
FIG. 2 is an exploded view of the floating fastener in accordance with the present invention.
Figure 3:
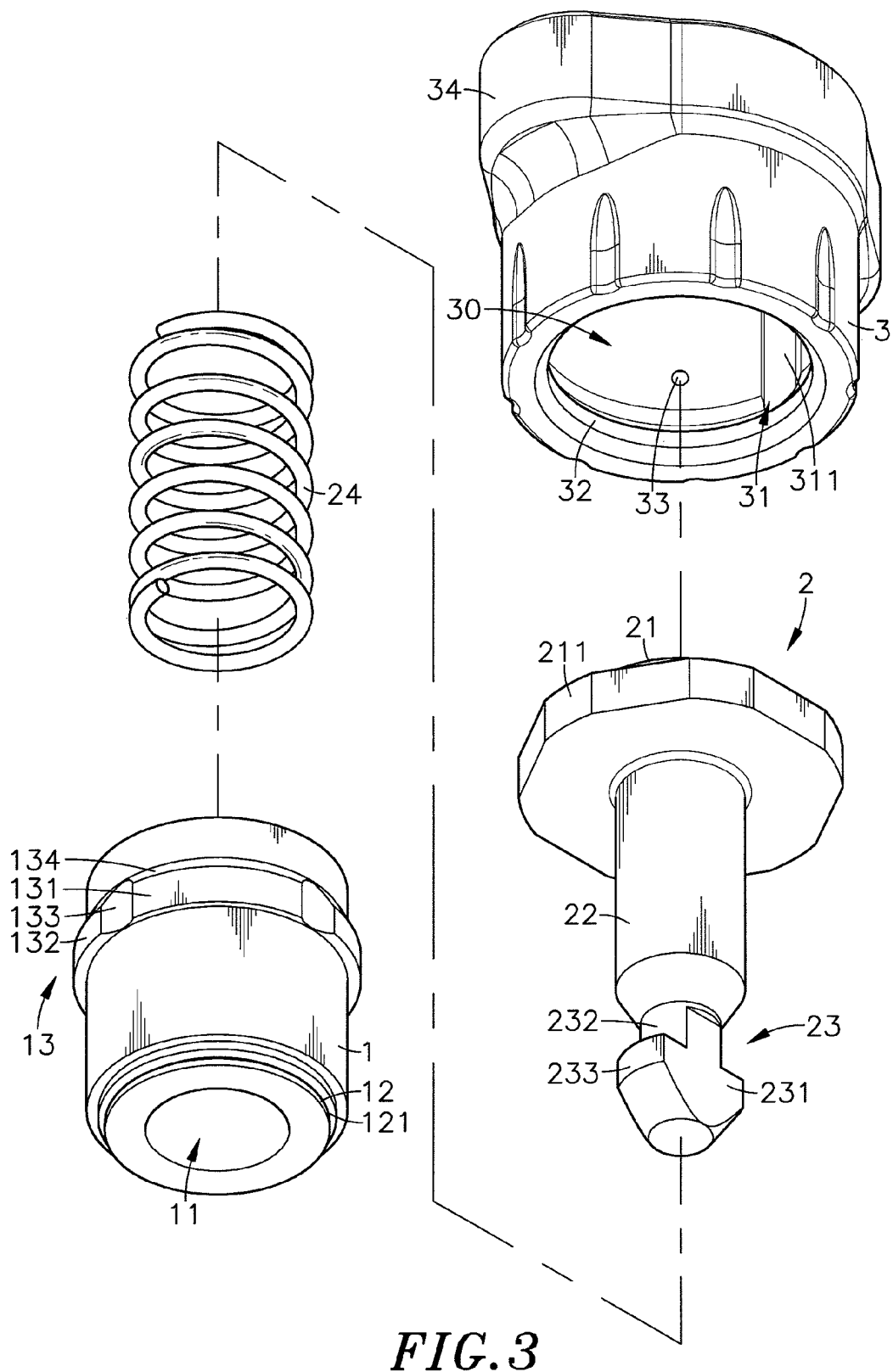
FIG. 3 is another exploded view of the floating fastener in accordance with the present invention when viewed from another angle.
Figure 4:
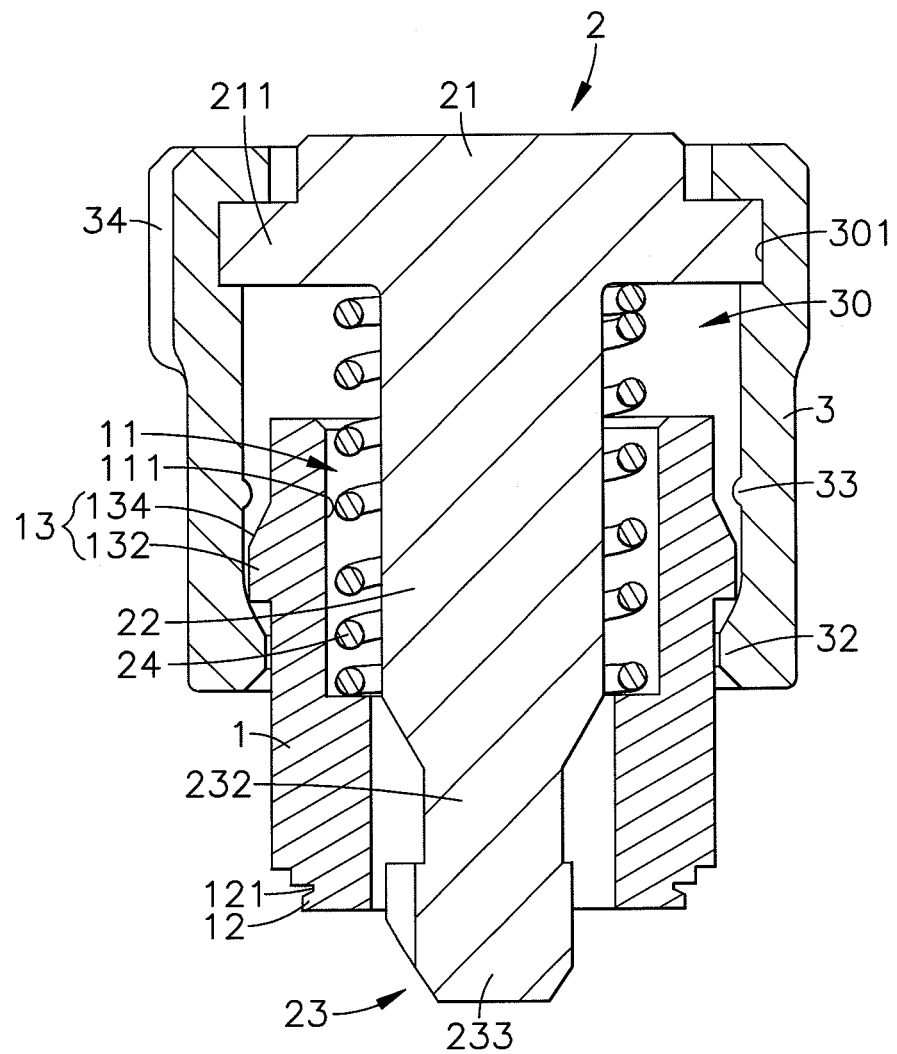
FIG. 4 is a sectional side view of the floating fastener in accordance with the present invention.
Figure 5:
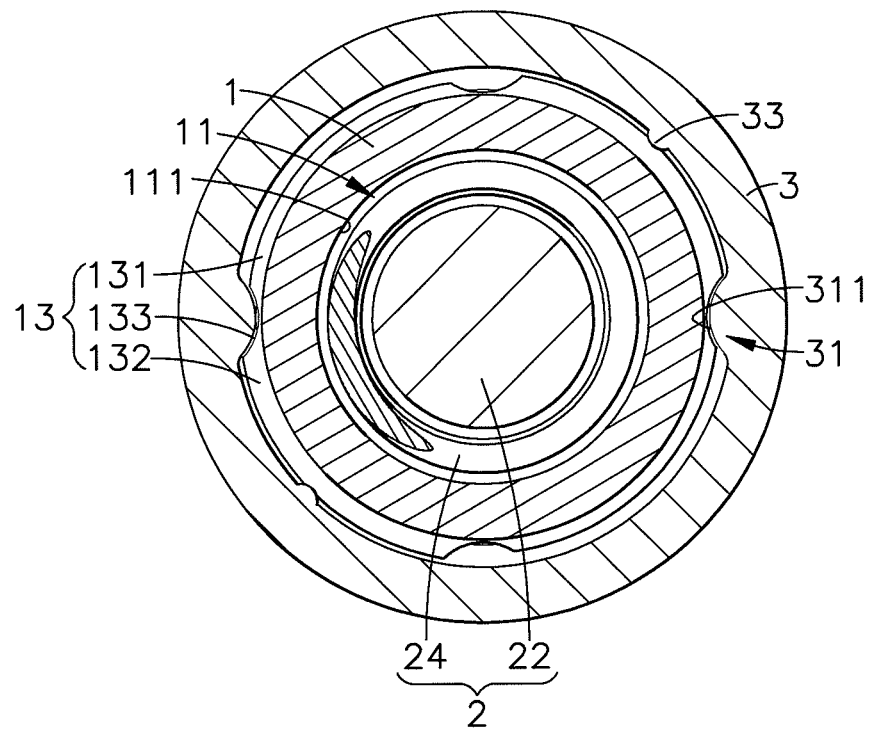
FIG. 5 is a sectional top view of the floating fastener in accordance with the present invention.
Figure 6:
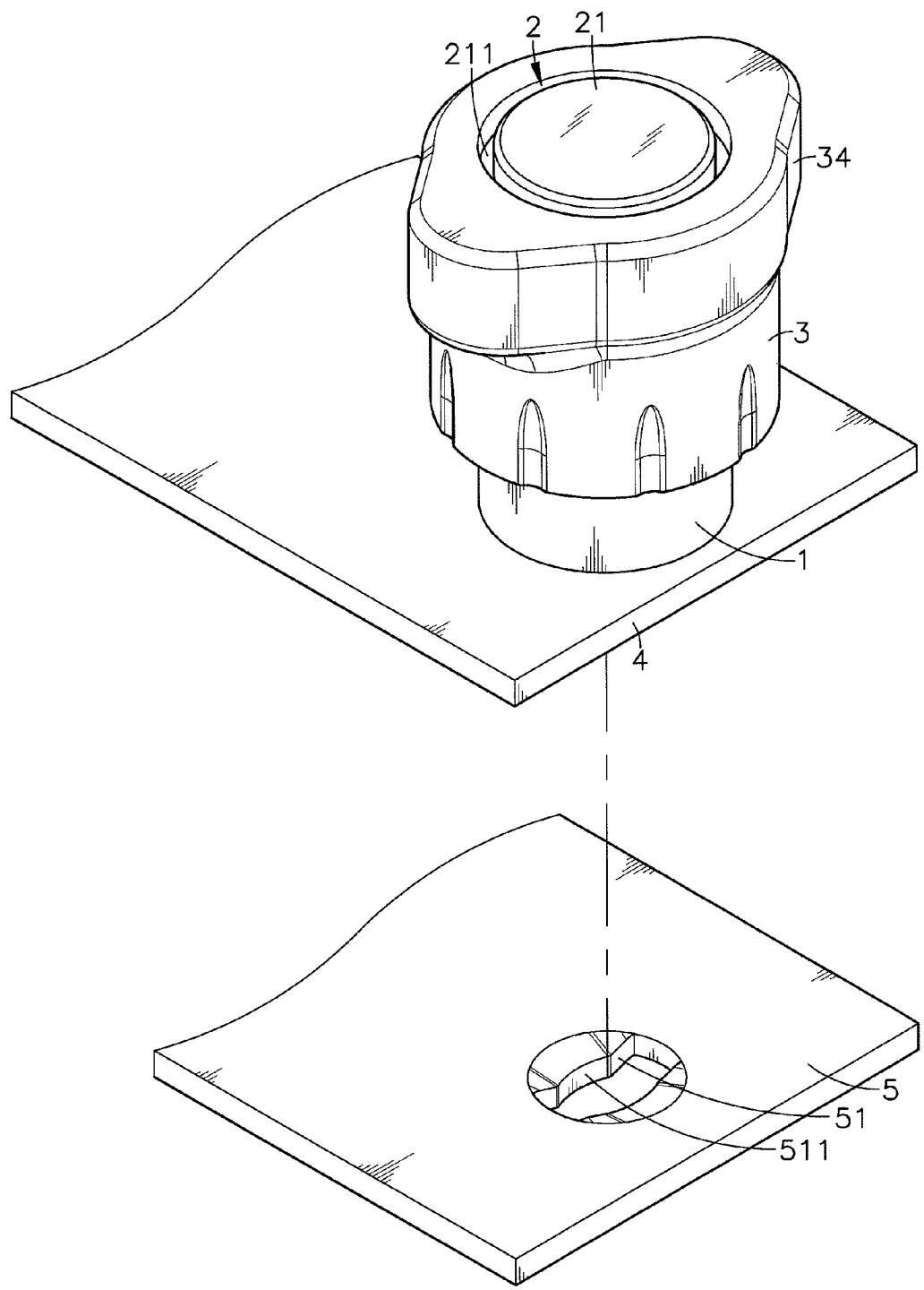
FIG. 6 is a schematic applied view of the present invention, illustrating the floating fastener installed in a first panel member before attachment of the first panel member to a second panel member.
Figure 7:
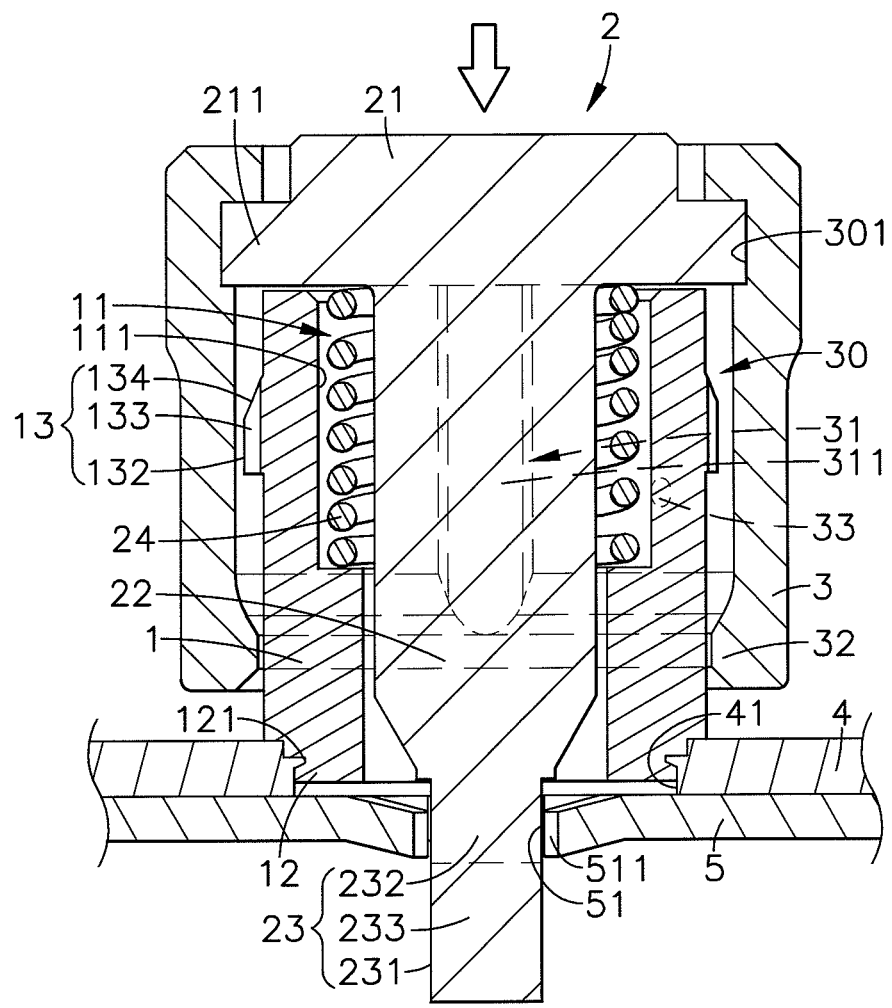
FIG. 7 is a schematic sectional applied view of the present invention, illustrating the cap member of the floating fastener lowered relative to the attached first panel member and second panel member and the locking tip inserted through the elongated locking hole of the second panel member.
Figure 8:
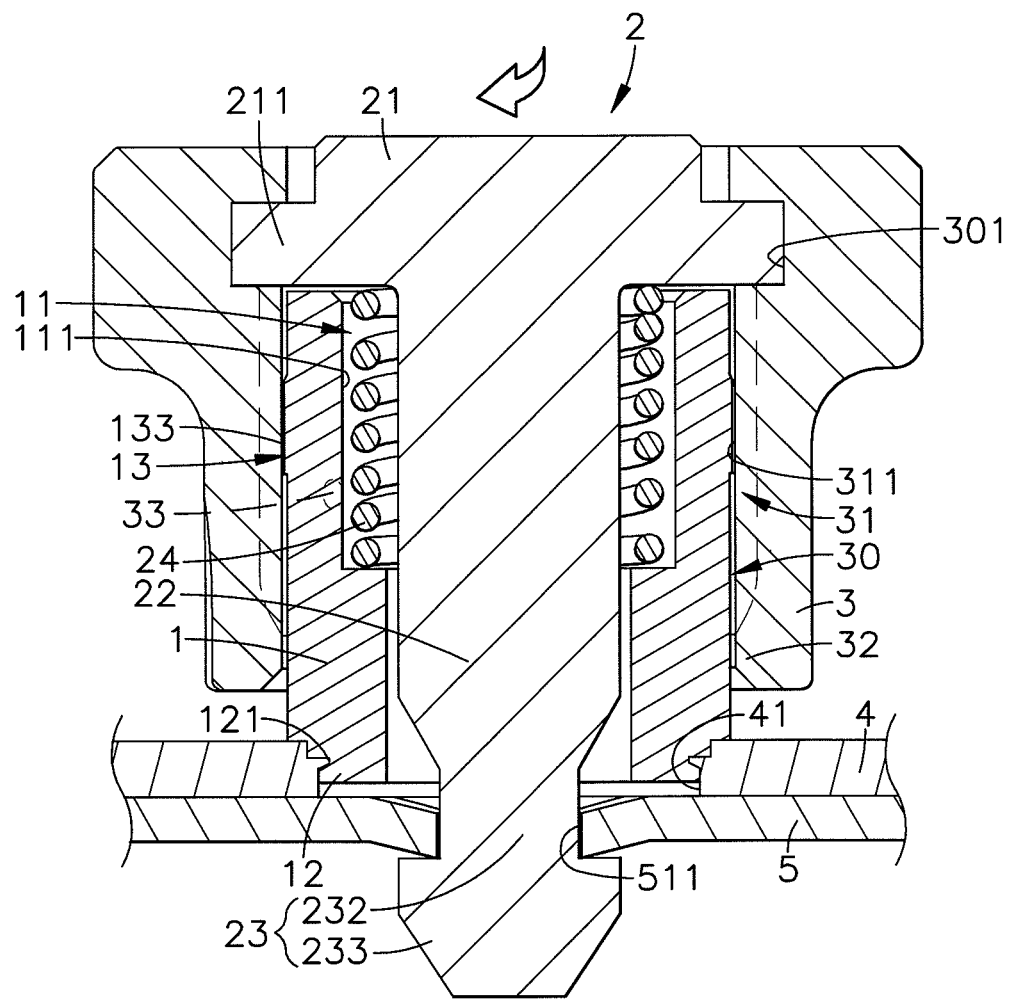
FIG. 8 corresponds to FIG. 7, illustrating the cap member and rotary fastening member of the floating fastener rotated from an unlocking position to a locking position.
Figure 9:
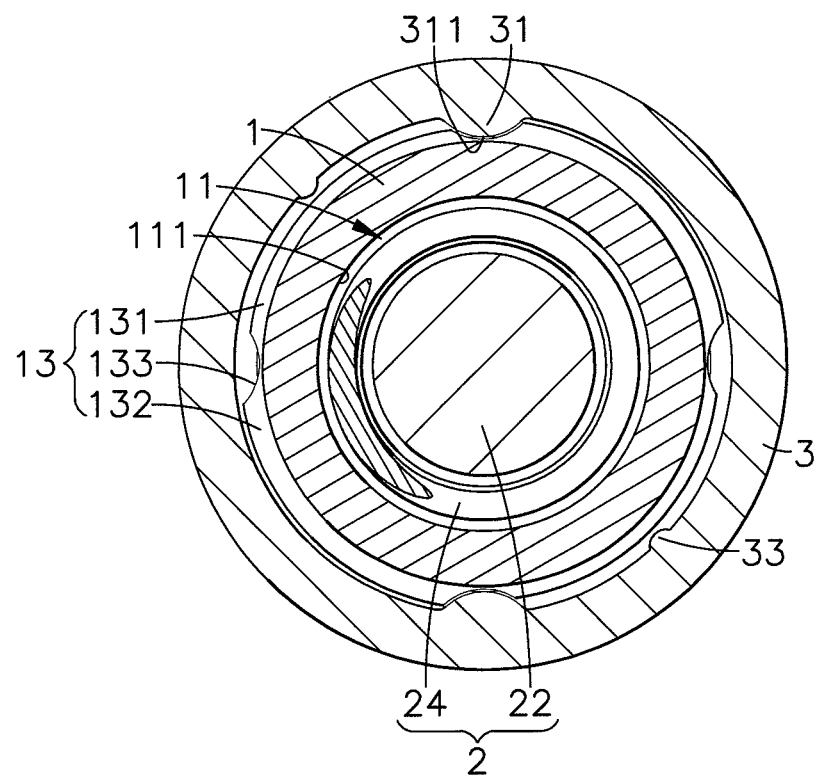
FIG. 9 is a sectional top view of the present invention, illustrating the rotary fastening member of the floating fastener rotated with the cap member to the locking position.

Referring to FIGS. 1, 2 and 3, a floating fastener in accordance with the present invention is shown. The floating fastener comprises a mounting base member 1, a rotary fastening member 2, an elastic member, for example, compression spring 24, and a cap member 3.

The mounting base member 1 is an open-ended cylindrical member comprising a recessed accommodation chamber 111 defined in a top side thereof, a through hole 11 vertically extending through opposing top and bottom sides thereof across the recessed accommodation chamber 111, a bottom mounting neck 12 downwardly extended from the bottom side around the through hole 11, a mounting groove 121 extending around the periphery of the bottom mounting neck 12, and a locating flange 13 extending around the periphery thereof. The locating flange 13 defines a plurality of alternatingly arranged guide block portions 131 and stop block portions 132, a vertical sliding groove 133 disposed between each guide block portion 131 and each adjacent stop block portion 132, and a bevel guide face 134 upwardly inwardly extended from the guide block portions 131, the stop block portions 132 and the vertical sliding grooves 133 and merged into the periphery of the mounting base member 1. Preferably, the vertical sliding grooves 133 are respectively spaced from one another at a 90° angle.

The rotary fastening member 2 comprises a head 21 suspending above the mounting base member 1, an engagement portion 211 extending around the periphery of the head 21, a shank 22 perpendicularly downwardly extended from the flat bottom wall of the head 21 and inserted into the through hole 11 of the mounting base member 1 and terminating in a locking tip 23 that suspends outside the cap member 21. The locking tip 23 defines an arrowhead-shaped locking portion 233, a neck portion 232 connected between the bottom edge of the shank 22 and the top edge of the arrowhead-shaped locking portion 233, and at least one, for example, two longitudinal cut planes 231 located at the neck portion 232 and the arrowhead-shaped locking portion 233 at two opposite lateral sides.

The compression spring 24 is mounted in the recessed accommodation chamber 111 of the mounting base member 1 around the shank 22 of the rotary fastening member 2, and stopped between the bottom wall of the accommodation chamber 111 and the flat bottom wall of the head 21 of the rotary fastening member 2.

The cap member 3 comprises an accommodation open space 30 surrounded by an inside wall thereof and extending through opposing top and bottom sides thereof, an inside locating groove 301 extending around the accommodation open chamber 30 and disposed near the top side for engagement with the engagement portion 211 of the rotary fastening member 2, a plurality of longitudinal ribs 31 spaced around the inside wall corresponding to the vertical sliding grooves 133 of the locating flange 13 of the mounting base member 1, an inside bottom stop flange 32 curved from the bottom edge of the bottom wall and suspending below the longitudinal ribs 31, at least one raised portion 33 protruded from the inside wall above the inside bottom stop flange 32, and a grip 34 located at the top side around the accommodation open space 30. Further, each longitudinal rib 31 defines a smoothly arched outer surface 311.

Further, the aforesaid rotary fastening member 2 can be a one-piece metal member made by forging, extrusion or machining technology. The cap member 3 can be a plastic member directly molded on the head 21 of the rotary fastening member 2 by insert molding. Alternatively, the engagement portion 211 of the rotary fastening member 2 can be forced into engagement with the inside locating groove 301 of the cap member 3 using a mounting technique. Further, the engagement portion 211 of the rotary fastening member 2 can be formed on the periphery of the head 21 of the rotary fastening member 2 using extrusion, embossing or grinding. All modifications and equivalent structural changes made from the specification and drawings of the present invention shall be included in the appended claims of the present invention.

When assembling the floating fastener, sleeve the compression spring 24 onto the shank 22 of the locking device 2 after the cap member 3 is molded on or fastened to the head 21 of the locking device 2, and then insert the shank 22 of the locking device 2 into the through hole 11 of the mounting base member 1 to have the compression spring 24 be stopped between the bottom wall of the recessed accommodation chamber 111 and the flat bottom wall of the head 21 of the rotary fastening member 2, and then lower the cap member 3 to move the smoothly arched outer surfaces 311 of the longitudinal ribs 31 over the vertical sliding grooves 133 of the locating flange 13 of the mounting base member 1 respectively. After the raised portion 33 passed over the bevel guide face 134 of the locating flange 13 of the mounting base member 1, the mounting base member 1 is accommodated in the accommodation open space 30 of the cap member 3. At this time, the inside bottom stop flange 32 of the cap member 3 is stopped at the bottom side of the locating flange 13 of the mounting base member 1 to prevent the cap member 3 from falling out of the mounting base member 1, and thus, the floating fastener is well assembled.

Referring to FIGS. 6-9, during application of the floating fastener, the mounting base member 1 of the floating fastener is installed in a mounting through hole 41 of a first panel member 4 and then detachably fastened to an elongated locking hole 51 of a second panel member 5 to lock the first panel member 4 and the second panel member 5 in a stacked condition. When installing the floating fastener in the first panel member 4, insert the bottom mounting neck 12 of the mounting base member 1 into the mounting through hole 41 of the first panel member 4, and then use a punching tool to punch the head 21 of the rotary fastening member 2 against the first panel member 4, forcing the mounting groove 121 of the bottom mounting neck 12 into tightly engagement with the deformed periphery of the mounting through hole 41 of the first panel member 4.

After installation of the floating fastener in the first panel member 4, attach the first panel member 4 to the second panel member 5 to keep the mounting through hole 41 and the elongated locking hole 51 in alignment, and then apply a pressure to the cap member 3 to move the longitudinal ribs 31 along the vertical sliding grooves 133 of the locating flange 13 of the mounting base member 1 and to force the locking tip 23 into the elongated locking hole 51 of the second panel member 5 and to compress the compression spring 24. When the raised portion 33 of the cap member 3 touches the bevel guide face 134 of the locating flange 13 of the mounting base member 1, enhance the applied force to force the raised portion 33 over the bevel guide face 134 to the bottom side of the locating flange 13. After the raised portion 33 has been moved over the bevel guide face 134 to the bottom side of the locating flange 13, the user's hand can sense this elevational change. At this time, the locking tip 23 of the rotary fastening member 2 has reached the elevation below the bottom edge of the elongated locking hole 51 of the second panel member 5.

After the locking tip 23 of the rotary fastening member 2 is lowered to the elevation below the bottom edge of the elongated locking hole 51 of the second panel member 5, the two longitudinal cut planes 231 of the locking tip 23 respectively face toward two opposite long sides of the elongated locking hole 51 of the second panel member 5. At this time, rotate the cap member 3 through a predetermined angle, for example, a 90° angle relative to the attached first panel member 4 and second panel member 5 either clockwise or counter-clockwise to move the longitudinal ribs 31 from one respective vertical sliding groove 133 over one respective adjacent guide block portion 131 to another respective vertical sliding groove 133 and stopped against one respective stop block portion 132, at this time, the neck portion 232 of the locking tip 23 is suspended in a notched portion 511 in the elongated locking hole 51 of the second panel member 5, and the arrowhead-shaped locking portion 233 of the locking tip 23 is stopped against the bottom wall of the second panel member 5, avoiding escape of the locking tip 23 out of the elongated locking hole 51 of the second panel member 5 due to an accidental shearing force, and thus, the first panel member 4 and the second panel member 5 are locked together.

When going to remove the first panel member 4 from the second panel member 5, rotate the cap member 3 in the reversed direction through a 90° angle to shift the longitudinal ribs 31 from one respective vertical sliding groove 133 to another respective vertical sliding groove 133 again. At this time, the two longitudinal cut planes 231 of the locking tip 23 are returned to face toward the two opposite long sides of the elongated locking hole 51 of the second panel member 5, enabling the rotary fastening member 2 to be pushed upwardly in direction away from the elongated locking hole 51 of the second panel member 5 by the elastic potential energy of the compression spring 24 to the extent where the raised portion 33 of the cap member 3 is stopped at the bottom edge of the locating flange 13 of the mounting base member 1. Thereafter, impart an upward pulling force to the cap member 3 to move the raised portion 33 over the locating flange 13 of the mounting base member 1, and then remove the first panel member 4 from the second panel member 5. Through a rotary motion to rotate the cap member 3 and the rotary fastening member 2 relative to the mounting base member 1, the floating fastener can lock the first panel member 4 to the second panel member 5 or unlock the first panel member 4 from the second panel member 5. Thus, the floating fastener has the advantages of ease of use, high installation reliability and high positioning accuracy.

Figure 10:
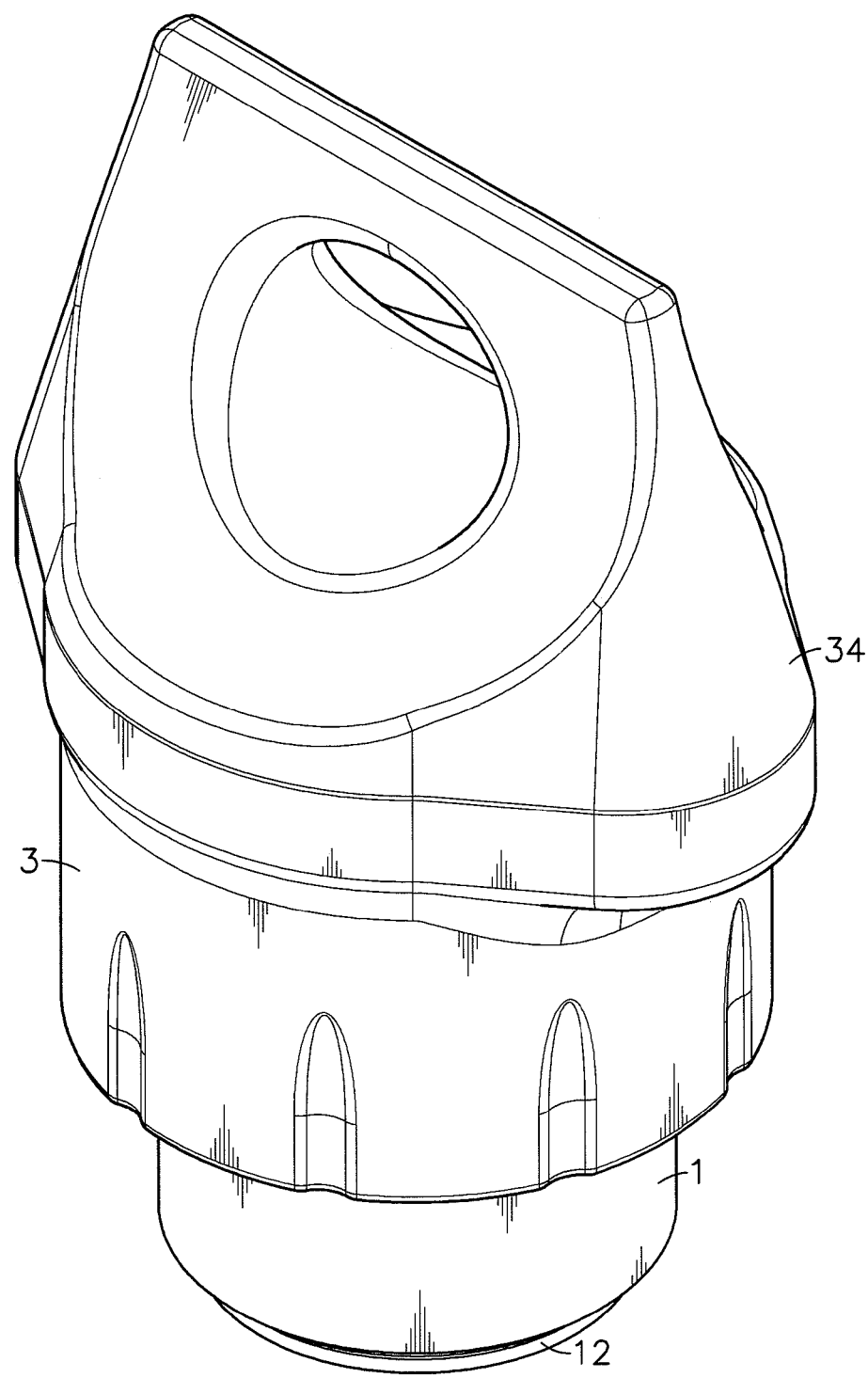
FIG. 10 is an oblique top elevational view of an alternate form of the floating fastener in accordance with the present invention.
Figure 11:
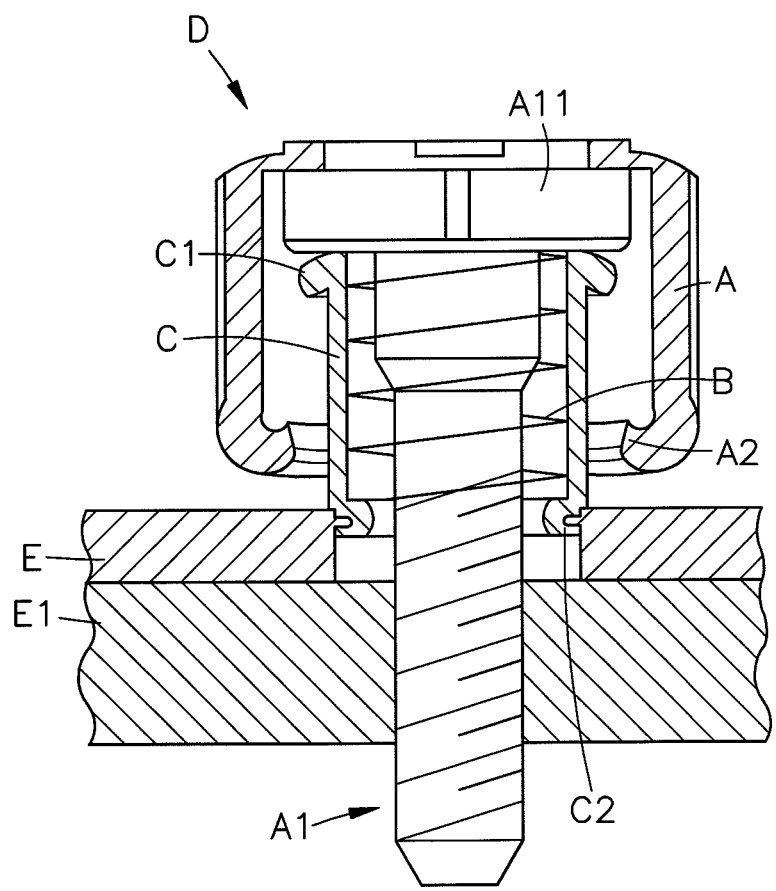
FIG. 11 is a sectional applied view of a floating fastener according to the prior art.

Referring to FIG. 10 and FIG. 2 again, the grip 34 of the cap member 3 can be variously embodied. In the embodiment shown in FIG. 10, the grip 34 extends over the top side of the accommodation open space 30 of the cap member 3, allowing the user to rotate the cap member 3 and the rotary fastening member 2 with less effort.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A floating fastener installed in a mounting through hole of a first panel member and adapted for detachably locking said first panel member to an elongated locking hole of a second panel member, comprising:
  a mounting base member comprising opposing top side and bottom side, a through hole vertically extending through said opposing top and bottom sides, a bottom mounting neck downwardly extended from said bottom side around said through hole and affixed to said first panel member, and a locating flange extending around the periphery thereof, said locating flange defining a plurality of guide block portions and stop block portions alternatingly arranged around the periphery of said mounting base member and a vertical sliding groove disposed between each said guide block portion and each adjacent said stop block portion;
  a rotary fastening member axially movably mounted in said mounting base member and detachably lockable to the elongated locking hole of said second panel member, said rotary fastening member comprising a head suspended above said mounting base member, a shank perpendicularly downwardly extended from a flat bottom wall of said head and inserted into the through hole of said mounting base member and terminating in a locking tip, said locking tip defining an arrowhead-shaped locking portion insertable through the elongated locking hole of said second panel member in a predetermined angle and lockable to said second panel member after insertion through the elongated locking hole of said second panel member and a rotary motion relative to said second panel member, and at least one longitudinal cut plane located at said arrowhead-shaped locking portion;
  an elastic member mounted around said shank of said rotary fastening member and stopped between the flat bottom wall of said head of said rotary fastening member and a part inside said mounting base member; and
  a cap member affixed to said head of said rotary fastening member, said cap member comprising an accommodation open space surrounded by an inside wall thereof and extending through opposing top and bottom sides thereof for accommodating said mounting base member and said rotary fastening member, a plurality of longitudinal ribs spaced around the inside wall thereof and respectively slidably coupled to said vertical sliding grooves of said locating flange of said mounting base member, and an inside bottom stop flange curved from a bottom edge thereof and slidably coupled to the periphery of said mounting base member and stoppable at a bottom side of said locating flange of said mounting base member.

2. The floating fastener as claimed in claim 1, wherein said mounting base member further comprises a recessed accommodation chamber defined in a top side of the through hole of said mounting base member; said elastic member is a compression spring mounted around said shank of said rotary fastening member and stopped between the flat bottom wall of said head of said rotary fastening member and a bottom wall of said recessed accommodation chamber.

3. The floating fastener as claimed in claim 1, wherein said locating flange of said mounting base member comprises a bevel guide face upwardly inwardly extended from said guide block portions, said stop block portions and said vertical sliding grooves and merged into the periphery of said mounting base member; said cap member further comprises at least one raised portion protruded from the inside wall thereof above said inside bottom stop flange.

4. The floating fastener as claimed in claim 1, wherein said vertical sliding grooves of said locating flange of said mounting base member are respectively spaced from one another at a 90° angle.

5. The floating fastener as claimed in claim 1, wherein said rotary fastening member further comprises an engagement portion extending around the periphery of said head; said cap member further comprises an inside locating groove extending around said accommodation open space and tightly engaged with said engagement portion of said rotary fastening member.

6. The floating fastener as claimed in claim 1, wherein said cap member is a plastic member molded on said head of said rotary fastening member by insert molding.

7. The floating fastener as claimed in claim 1, wherein said locking tip further comprises a neck portion connected between said shank and said arrowhead-shaped locking portion.

8. The floating fastener as claimed in claim 1, wherein said cap member further comprises a grip extended from the top side thereof and extending over said accommodation open space.

* * * * *